US011803918B2

(12) United States Patent
Frieden

(10) Patent No.: US 11,803,918 B2
(45) Date of Patent: Oct. 31, 2023

(54) SYSTEM AND METHOD FOR IDENTIFYING EXPERTS ON ARBITRARY TOPICS IN AN ENTERPRISE SOCIAL NETWORK

(71) Applicant: ORACLE INTERNATIONAL CORPORATION, Redwood Shores, CA (US)

(72) Inventor: Kurt Frieden, Woodside, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 407 days.

(21) Appl. No.: 15/182,312

(22) Filed: Jun. 14, 2016

(65) Prior Publication Data

US 2017/0011041 A1 Jan. 12, 2017

Related U.S. Application Data

(60) Provisional application No. 62/189,644, filed on Jul. 7, 2015.

(51) Int. Cl.

| | |
|---|---|
| ***G06F 16/24*** | (2019.01) |
| ***G06Q 50/00*** | (2012.01) |
| ***G06Q 10/0639*** | (2023.01) |
| ***G06Q 10/0631*** | (2023.01) |

(52) U.S. Cl.

CPC ......... *G06Q 50/01* (2013.01); *G06Q 10/0639* (2013.01); *G06Q 10/063112* (2013.01)

(58) Field of Classification Search

CPC ............................ G06F 16/9535; G06Q 50/01

See application file for complete search history.

(56) References Cited

U.S. PATENT DOCUMENTS

| | | | |
|---|---|---|---|
| 5,627,886 | A | 5/1997 | Bowman |
| 6,026,388 | A | 2/2000 | Liddy et al. |
| 6,076,088 | A | 6/2000 | Paik et al. |
| 6,208,956 | B1 | 3/2001 | Motoyama |
| 6,401,096 | B1 | 6/2002 | Zellweger |
| 6,434,556 | B1 | 8/2002 | Levin et al. |
| 6,439,783 | B1 | 8/2002 | Antoshenkov |

(Continued)

OTHER PUBLICATIONS

Gleich, et al., "Fast Parallel PageRank: A Linear System Approach", May 2005, Yahoo Labs, pp. 1-8, 8 pages.

(Continued)

*Primary Examiner* — Mohammad S Rostami
(74) *Attorney, Agent, or Firm* — TUCKER ELLIS LLP

(57) ABSTRACT

A system and method for supporting identifying experts on arbitrary topics in an enterprise social network. An exemplary method can receive, at a node of a social network application, a plurality of content. The method can store the plurality of content in a database associated with the social network application. The method can index the plurality of content, resulting in an index of content, wherein the index of content includes a plurality of activity signals and a plurality of security values. The method can receive a request for a search for at least one expert on an arbitrary topic. The method can search the index of content for the at least one expert on the arbitrary topic, resulting in a plurality of search results. The method can next assign a weight for each of the plurality of search results based at least on the plurality of activity signals.

20 Claims, 6 Drawing Sheets

(56) References Cited

U.S. PATENT DOCUMENTS 6,591,265 B1 7/2003 Erickson et al.
6,804,683 B1 10/2004 Matsuzaki et al.
6,901,403 B1 5/2005 Bata et al.
7,003,522 B1 2/2006 Reynar et al.
7,058,628 B1 6/2006 Page
7,194,458 B1 3/2007 Micaelian et al.
7,251,637 B1 7/2007 Caid et al.
7,343,374 B2 3/2008 Berkhin
7,356,530 B2 4/2008 Kim et al.
9,244,985 B1 * 1/2016 Haugen .................. G06F 21/62
2001/0054115 A1 12/2001 Ferguson et al.
2002/0049738 A1 4/2002 Epstein
2002/0059230 A1 5/2002 Hunepohl et al.
2002/0087526 A1 7/2002 Rao
2002/0129014 A1 9/2002 Kim et al.
2003/0023570 A1 1/2003 Kobayashi et al.
2003/0033288 A1 2/2003 Shanahan et al.
2003/0084048 A1 5/2003 Dweck et al.
2003/0120671 A1 6/2003 Kim et al.
2003/0140037 A1 7/2003 Deh-Lee
2003/0154359 A1 8/2003 Henry et al.
2003/0163363 A1 8/2003 Pratte et al.
2003/0204502 A1 10/2003 Tomlin et al.
2003/0208482 A1 11/2003 Kim et al.
2003/0217047 A1 11/2003 Marchisio
2003/0225750 A1 12/2003 Farahat et al.
2003/0237051 A1 12/2003 LaMarca et al.
2004/0015495 A1 1/2004 Kim et al.
2004/0078363 A1 4/2004 Kawatani
2004/0111412 A1 6/2004 Broder
2004/0117354 A1 6/2004 Azzaro et al.
2004/0133589 A1 7/2004 Kiessig et al.
2004/0139059 A1 7/2004 Conroy et al.
2004/0162827 A1 8/2004 Nakano
2004/0210661 A1 10/2004 Thompson
2005/0027685 A1 2/2005 Kamvar et al.
2005/0065908 A1 3/2005 Silverbrook et al.
2005/0071741 A1 3/2005 Acharya et al.
2005/0076001 A1 4/2005 Gauthier et al.
2005/0086215 A1 4/2005 Perisic
2005/0154699 A1 7/2005 Lipkin et al.
2005/0165757 A1 7/2005 Broder
2005/0165762 A1 7/2005 Bishop
2005/0171742 A1 8/2005 Bennighof
2005/0216827 A1 9/2005 Mochizuki
2005/0222975 A1 10/2005 Nayak et al.
2005/0223313 A1 10/2005 Geraud
2005/0256860 A1 11/2005 Eiron et al.
2005/0256867 A1 11/2005 Walther et al.
2006/0026128 A1 2/2006 Bier
2006/0041535 A1 2/2006 Qamhiyah et al.
2006/0041548 A1 2/2006 Parsons et al.
2006/0047643 A1 3/2006 Chaman
2006/0047656 A1 3/2006 Dehlinger et al.
2006/0080314 A1 4/2006 Hubert et al.
2006/0080321 A1 4/2006 Horn et al.
2006/0080335 A1 4/2006 Freeborg et al.
2006/0106793 A1 5/2006 Liang
2006/0112111 A1 5/2006 Tseng et al.
2006/0117012 A1 6/2006 Rizzolo et al.
2006/0143175 A1 6/2006 Ukrainczyk et al.
2006/0143236 A1 6/2006 Wu
2006/0149720 A1 7/2006 Dehlinger
2006/0184539 A1 8/2006 Blake et al.
2006/0190488 A1 8/2006 Cohen et al.
2006/0200556 A1 9/2006 Brave et al.
2006/0218100 A1 9/2006 Silverbrook et al.
2006/0218114 A1 9/2006 Weare et al.
2006/0238381 A1 10/2006 Kimchi et al.
2006/0242554 A1 10/2006 Gerace et al.
2006/0248076 A1 11/2006 Troy et al.
2006/0259475 A1 11/2006 Dehlinger
2006/0259481 A1 11/2006 Handley
2006/0282328 A1 12/2006 Gerace et al.
2006/0294086 A1 12/2006 Rose et al.
2006/0294124 A1 12/2006 Cho
2006/0294134 A1 12/2006 Berkhim et al.
2007/0011073 A1 1/2007 Gardner et al.
2007/0011155 A1 1/2007 Sarkar
2007/0016599 A1 1/2007 Plastina et al.
2007/0027840 A1 2/2007 Cowling et al.
2007/0038614 A1 2/2007 Guha
2007/0043723 A1 2/2007 Bitan et al.
2007/0043761 A1 2/2007 Chim et al.
2007/0061219 A1 3/2007 Palestrant et al.
2007/0078828 A1 4/2007 Parikh et al.
2007/0078832 A1 4/2007 Ott et al.
2007/0088832 A1 4/2007 Tsang et al.
2007/0106659 A1 5/2007 Lu et al.
2007/0112761 A1 5/2007 Xu et al.
2007/0118515 A1 5/2007 Dehlinger
2007/0124299 A1 5/2007 Martin et al.
2007/0136429 A1 6/2007 Fine et al.
2007/0136657 A1 6/2007 Blumenthal et al.
2007/0174275 A1 7/2007 Kan et al.
2007/0179958 A1 8/2007 Chen et al.
2007/0185858 A1 8/2007 Lu et al.
2007/0208613 A1 9/2007 Backer
2007/0214133 A1 9/2007 Liberty et al.
2007/0244903 A1 10/2007 Ratliff et al.
2007/0250500 A1 10/2007 Ismalon
2008/0005064 A1 1/2008 Sarukkai
2008/0005086 A1 1/2008 Moore
2008/0010615 A1 1/2008 Curtis et al.
2008/0016052 A1 1/2008 Frieden
2008/0016053 A1 1/2008 Frieden et al.
2008/0016071 A1 1/2008 Frieden et al.
2008/0016072 A1 1/2008 Frieden et al.
2008/0016098 A1 1/2008 Frieden et al.
2008/0016161 A1 1/2008 Frieden et al.
2008/0183694 A1 * 7/2008 Cane .................. G06F 16/9535
2010/0257183 A1 * 10/2010 Kim ...................... G06Q 10/10 707/748
2011/0093506 A1 * 4/2011 Lunt ................. G06Q 30/0275 707/798
2011/0145219 A1 * 6/2011 Cierniak ............ G06F 16/9535 707/709
2012/0150831 A1 * 6/2012 Sun ...................... G06F 16/951 707/706
2012/0290660 A1 * 11/2012 Rao ....................... G06Q 30/08 709/204
2012/0310927 A1 * 12/2012 Johnson ............... G06F 16/951 707/723
2012/0310929 A1 * 12/2012 Patterson ............. G06F 16/248 707/728
2012/0331391 A1 * 12/2012 Kanjirathinkal ....... G06Q 50/01 715/738
2013/0018896 A1 * 1/2013 Fleischman ........... G06Q 50/01 707/748
2013/0046760 A1 * 2/2013 Evans ................... G06Q 50/01 707/728
2013/0231975 A1 * 9/2013 High ................. G06Q 30/0201 705/7.29
2013/0275438 A1 * 10/2013 Ajmera ................. G06Q 50/01 707/748
2013/0332479 A1 * 12/2013 Liu ...................... G06F 16/951 707/769
2014/0067828 A1 * 3/2014 Archibong .......... H04L 65/4084 707/748
2014/0280235 A1 * 9/2014 Lacage .................. G06F 16/38 707/749
2014/0304249 A1 * 10/2014 Ayzenshtat ......... G06F 16/9535 707/709
2015/0012449 A1 * 1/2015 Jackson ................ G06Q 50/01 705/319
2015/0120717 A1 * 4/2015 Kim ..................... G06F 16/335 707/727
2015/0169584 A1 * 6/2015 Kwok .............. G06F 16/24578 707/730
2015/0205869 A1 * 7/2015 Green .................... G06F 16/93 707/726

(56) References Cited

U.S. PATENT DOCUMENTS

| | | | | |
|---|---|---|---|---|
| 2016/0034466 | A1* | 2/2016 | Sinha | H04L 67/306 707/732 |
| 2016/0034586 | A1* | 2/2016 | Makhani | G06F 16/24578 707/706 |
| 2016/0055160 | A1* | 2/2016 | Himel | G06F 16/24578 707/728 |
| 2016/0078110 | A1* | 3/2016 | Johnson | G06F 16/248 707/734 |
| 2016/0147893 | A1* | 5/2016 | Mashiach | G06Q 50/01 707/710 |
| 2016/0179934 | A1* | 6/2016 | Stubley | G06F 16/243 707/722 |
| 2016/0188736 | A1* | 6/2016 | Richter | G06F 16/9535 707/728 |
| 2016/0196265 | A1* | 7/2016 | Allen | G06F 16/248 707/734 |
| 2016/0292163 | A1* | 10/2016 | He | G06Q 50/01 |
| 2016/0292288 | A1* | 10/2016 | Walton | G06F 16/335 |
| 2016/0292582 | A1* | 10/2016 | Kozloski | G06N 5/048 |
| 2016/0342900 | A1* | 11/2016 | Allen | G06Q 10/109 |
| 2016/0373397 | A1* | 12/2016 | Kesten | H04L 67/02 |
| 2016/0378865 | A1* | 12/2016 | Makhani | G06F 16/9535 707/721 |

OTHER PUBLICATIONS

International Search Report for PCT/US2007/000742, dated Feb. 19, 2008, 3 pages.

International Search Report for PCT/US2007/000748, dated Feb. 19, 2008, 4 pages.

International Search Report for PCT/US2007/000750, dated Mar. 3, 2008, 3 pages.

Langville, et al., "Deeper Inside PageRank", Oct. 20, 2004, Internet Mathematics, pp. 1-33, 33 pages.

Pasmanter, et al., "Cyclic Markov chains with an application to an intermediate ENSO model", Jan. 1, 2003, Nonlinear Processes in Geophysics, European Geosciences Union 2003, pp. 197-210, 15 pages.

United States Patent and Trademark Office, Office Action dated Apr. 25, 2008 for U.S. Appl. No. 11/461,549, 22 Pages.

United States Patent and Trademark Office, Office Action dated Apr. 29, 2008 for U.S. Appl. No. 11/461,555, 23 Pages.

United States Patent and Trademark Office, Office Action dated May 14, 2008 for U.S. Appl. No. 11/461,575, 20 Pages.

United States Patent and Trademark Office, Office Action dated Aug. 14, 2008 for U.S. Appl. No. 11/461,549, 26 Pages.

United States Patent and Trademark Office, Office Action dated Aug. 14, 2008 for U.S. Appl. No. 11/461,555, 25 Pages.

United States Patent and Trademark Office, Office Action dated Sep. 17, 2008 for U.S. Appl. No. 11/461,575, 24 Pages.

United States Patent and Trademark Office, Office Action dated Oct. 28, 2008 for U.S. Appl. No. 11/461,555, 27 Pages.

United States Patent and Trademark Office, Office Action dated Dec. 16, 2008 for U.S. Appl. No. 11/461,549, 27 Pages.

United States Patent and Trademark Office, Office Action dated Dec. 16, 2008 for U.S. Appl. No. 11/461,575, 27 Pages.

United States Patent and Trademark Office, Office Action dated Jan. 12, 2009 for U.S. Appl. No. 11/461,568, 31 Pages.

United States Patent and Trademark Office, Office Action dated Mar. 30, 2009 for U.S. Appl. No. 11/461,588, 22 Pages.

* cited by examiner 410 415 420 425 430 435

| Score | Author | Likes | Downloads | Conversation | Content |
|---|---|---|---|---|---|
| 5.0 | Author 1 | 3 | 0 | Pets | Aren't these kittens adorable... |
| 4.0 | Author 1 | 0 | 5 | Recipes | How to cook for kittens... |
| 3.0 | Author 1 | 1 | 0 | Pets | Cats and kittens in everyday... |
| 0.1 | Author 2 | 1 | 0 | Pets | Aren't these kittens adorable... |
| 0.1 | Author 2 | 0 | 1 | Pets | How to serve kittens... |
| 0.1 | Author 2 | 0 | 0 | Recipes | Cats and kittens in everyday... |
| 0.1 | Author 2 | 0 | 0 | Pets | Aren't these kittens adorable... |
| 0.1 | Author 2 | 0 | 1 | Hunting | How to serve kittens... |
| 0.1 | Author 2 | 0 | 0 | Recipes | Cats and kittens in everyday... |
| 0.1 | Author 2 | 0 | 0 | Recipes | Aren't these kittens adorable... |
| 0.1 | Author 2 | 0 | 0 | Hunting | How to serve kittens... |
| 0.1 | Author 2 | 0 | 1 | Wildlife | Cats and kittens in everyday... |
| 0.1 | Author 2 | 0 | 0 | Pets | Aren't these kittens adorable... |

FIGURE 4

SYSTEM AND METHOD FOR IDENTIFYING EXPERTS ON ARBITRARY TOPICS IN AN ENTERPRISE SOCIAL NETWORK

CLAIM OF PRIORITY

This application claims the benefit of priority to U.S. Provisional Application titled "SYSTEM AND METHOD FOR IDENTIFYING EXPERTS ON ARBITRARY TOPICS IN AN ENTERPRISE SOCIAL NETWORK", Application No. 62/189,644, filed Jul. 7, 2015.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and more particularly to social networks.

SUMMARY

A system and method for supporting identifying experts on arbitrary topics in an enterprise social network. An exemplary method can receive, at a node of a social network application, a plurality of content. The method can store the plurality of content in a database associated with the social network application. The method can index the plurality of content, resulting in an index of content, wherein the index of content includes a plurality of activity signals and a plurality of security values. The method can receive a request for a search for at least one expert on an arbitrary topic. The method can search the index of content for the at least one expert on the arbitrary topic, resulting in a plurality of search results. The method can next assign a weight for each of the plurality of search results based at least on the plurality of activity signals.

BRIEF DESCRIPTION OF THE FIGURES

FIG. 4 illustrates an intermediate search result, in accordance with an embodiment.

DETAILED DESCRIPTION

Described herein are a system and method for identifying experts on arbitrary topics in an enterprise social network.

Enterprise Social Network

Figure 1:
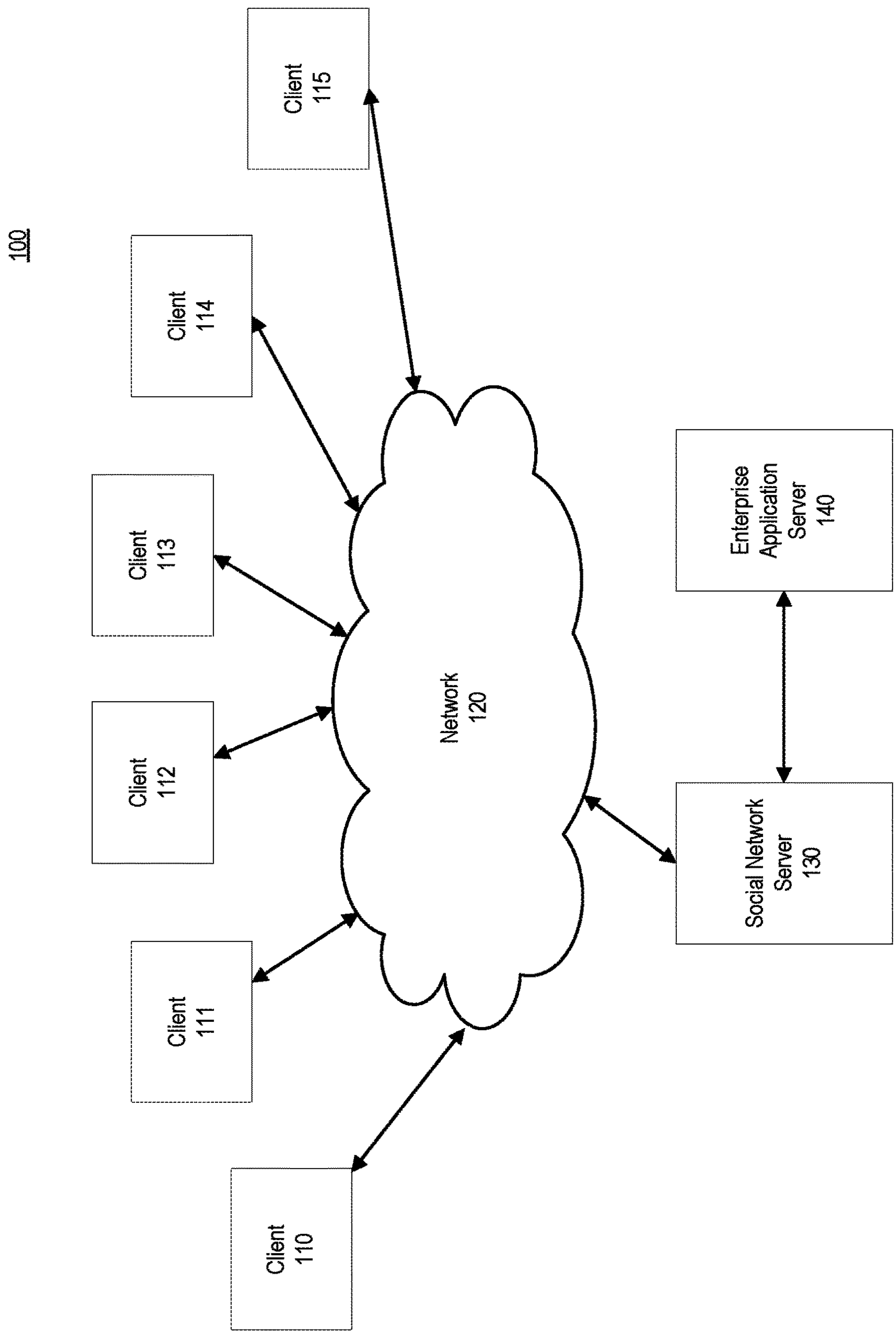
FIG. 1 illustrates an overview block diagram of an enterprise social network, in accordance with an embodiment.

FIG. 1 illustrates an overview block diagram of an enterprise social network, in accordance with an embodiment. An enterprise social network 100 can include a social network server/system 130 coupled to a variety of clients and/or client devices 110-115, through a network 120. Network 120 can include any type of communication network, such as the Internet or an Intranet or other private network. Clients and/or client devices 110-115 can be any type of device that allows a user to interface with server 130, including laptop computers, desktop computers, smart phones, tablets, phablets, wearables, and the like. The client devices can use a wired or wireless connection, or any other suitable method for connecting to the network. In accordance with an embodiment, a client can interface directly with the network (e.g., not via a network) through a directly coupled client device (not shown). Client/client devices can execute a web browser or other functionality that provides an interface with social network server 130. In certain embodiments, the enterprise social network 100 can be the Oracle™ Social Network (OSN).

In accordance with an embodiment, the social network server/system can, in conjunction with the other devices/clients depicted in FIG. 1, substantially provide the functionality of an enterprise social network. Enterprise application server 140, can, in an embodiment, be a server or servers that executes enterprise applications such as human resource applications customer relationship management applications, enterprise resource planning applications, search applications, and the like. For example, in certain embodiments the enterprise application servers on server 140 can be "Fusion" applications from Oracle Corporation. The social network server 130 can be directly coupled to enterprise application server 140. The social network server 130 can be also be coupled to enterprise application server 140 through any other suitable method, for example, over a network. In addition, the functionality of enterprise application server 140 can be included on social network server 130. Further, the enterprise application server 140 can be coupled to clients/client devices 110-115 directly, through a network, or by another suitable method rather than through social network server 130. The enterprise application server 140 is generally not part of social network 100, but can provide business objects and system-of-records that can be used to generate social objects.

Identifying Experts on Arbitrary Topics

Within social networks, a problem often faced by users is how to locate experts and others who potentially are knowledgeable about a particular topic or field. Some examples include a user of the social network who is involved with sales wishes to find a person who can help with a certain aspect of a deal, a customer support representative who wants to find someone who can help in solving a customer's issue or problems with a particular system or produce, or a manager who wants to find a person able to handle an escalation.

There currently exist two solutions to this problem, both having drawbacks. The first solution relies on employees and/or users of the enterprise social network to manually fill in profiles which can be indexed and searched. The problem arises with this solution when few users take the time to fill and update their respective profiles.

The other current solution involves indexing and searching private information, such as e-mail data. However, because such data is private, a search interface is not possible because it would provide a searcher with access to private information, such as discussions in private emails.

Because of this, a brokering system can be established where the searcher enters a topic and the system contacts people it identifies as experts and asks them if they would like to anonymously or publicly contact the searcher to help. The drawback of this system is that there is no immediate gratification for the searcher, and it still relies upon direct user interaction (i.e., it relies upon the person the search hit on actually responding to the searcher). With this solution, a searcher can send off a query, but there is no guarantee that the searcher will be contacted by an expert.

In accordance with an embodiment, a searcher looking for an expert in an arbitrary filed can get immediate search results while the search only searches information that is publicly available/already available to the searcher. This allows for the both immediate satisfaction while avoiding the problems associated with a brokering system, as described above. Additionally, because the results of the search are limited to files to which the searchers already have access, no private information has to be accessed by, for example, an indexing search engine.

In accordance with an embodiment, a search can utilize an index of information in combination with a searching method to find experts as if the experts were facets of a search, but return results instead of merely facets (i.e., experts/authors of search content can be associated with search results allowing for more precise identification of experts instead of merely identifying relevant content) In addition, in accordance with an embodiment, the search can additionally allow searchers to identify experts on arbitrary search phrases in a secure manner.

In accordance with an embodiment, publicly available content within an enterprise social network, such as Oracle Social Network, can be indexed such that it can be securely searched. Publicly available information can include, for example, documents posted to the social network, message posts, and other content accessible to others than the author. However, it should be noted that access to the indexed content can be restricted based upon an access level of a searcher. For example, the ability to search indexed content posted/generated within a secure group within the enterprise social network can be restricted to those members of the group. In other words, if a searcher does not have access to certain content while browsing or otherwise using the enterprise social network, then a search performed by the searcher can be likewise unable to access/search indexed content from those parts of the enterprise social network that the searcher is unable to access.

In accordance with an embodiment, the results of a search can be ordered based upon several factors, including how well the content matched the search phrase, in addition to other activity signals.

In accordance with an embodiment, an activity signal can include whether the content resolved an issue for a user of the enterprise social network. For example, in situations where there is a question and answer aspect/feature of an enterprise social network, a posted answer that has been marked as answering a question would denote that the content resolved an issue for another or a same user.

In accordance with an embodiment, an activity signal can include a number of "likes" or other indicators a content has received showing the content is appreciated or well received.

In accordance with an embodiment, an activity signal can include a number of users that have viewed the content.

In accordance with an embodiment, an activity signal can include a number of users that have bookmarked the content.

In accordance with an embodiment, an activity signal can include an activity rank of the content.

In accordance with an embodiment, each activity signal can be indexed as its own field of a content record in a search index. At search time, content results can be ordered, for example, by an algorithm such as the following:

$$\text{relevance}=\text{text}\times(0.1+(5\times\text{likes})+\text{views})$$

In accordance with an embodiment, in the above algorithm, "text" can be a text matching score, "likes" can be the number of other users who have "liked" the content, and "views" can be the number of people who have viewed the content. The matching score can be an indication of how well the actual text of a searched document/page matches a searcher's search term. For example, in returning a search for the term "cats," a page discussing airplane fuel consumption would score lower in the text matching score than a page discussing cat toys. The "0.1" in the above formula is represents a scaling factor that allows for a high priority to be placed on the number of likes of views versus just the text matching score. This scaling factor can be, optionally, adjusted.

In accordance with an embodiment, an algorithm used at search time to order the content results can be static or dynamic. In the case of a dynamic search formula, a user or application can specify the formula used to order the content results so as to fit the searcher's needs. For example, it a searcher is looking for a popular opinion, the search can place a higher importance on the number of likes that content has received in ordering the contents of the search result.

In accordance with an embodiment, the content results of a search can be screened for security before being assigned a relevance score. In an enterprise social network, a user can have access to certain content (e.g., publicly available content and/or content behind a password/subscription barrier to which the user has access to), while being unable to access other content (e.g., content to which access is restricted by membership and to which the user is not a member). For example, conversations that are public will generally be accessible to every user of an enterprise social network. However, there can exist certain conversations or threads to which access is restricted by membership/subscription.

In order to improve security within the search results, in accordance with an embodiment, indexed content can be assigned additional values, such as additional Boolean values, that indicate whether indexed content was accessed from a publicly available resource, and an identification of the conversation which contains the content (e.g., a ConversationID).

In accordance with an embodiment, a search phrase can be automatically transformed into an OR query in order to filter results tailored to a specific searcher (i.e., allowing for searching of non-public information to which the searcher has been granted access or permission). For example, if a search term is "cats", an expanded query could be "cats AND (isPublic:true OR ConversationID:1 OR ConversationID:2 . . . )" This allows for the search term to return only results that are either publicly available or accessible the searcher.

In accordance with an embodiment, after content responsive to a search is assigned a relevance score, the contents of the search results can be withheld. Instead, the names/identification of the various authors of the corresponding content can be returned to the searcher. In this way, a faceted search can order search facets by a number of results that facet is connected to. By treating authors of content as facets of the search, this allows the sum of the relevance scores of their respective content to be compared, allowing searchers to easily find experts/authors in arbitrary topics.

For example, suppose Author 1 and Author 2 both contributed content that hit on a search term. Author 1 has contributed 4 pieces of content, all with a high total relevance score of 5, 5, 4, and 3 (indicating, for example, high number of likes/views). Author 2 has contributed 10 pieces of content, each with a total relevance score of 0.2 (indicating, for example, a low number of likes/views). By summing the total relevance up, each relevance score related to the author (e.g., a search facet), Author 1 is recommended over Author 2, despite having fewer contributions. Thus, Author 1 would be the first recommended expert over Author 2 because Author 1's total relevance score is 17, versus Author 2's total relevance score of 2.

Figure 2:
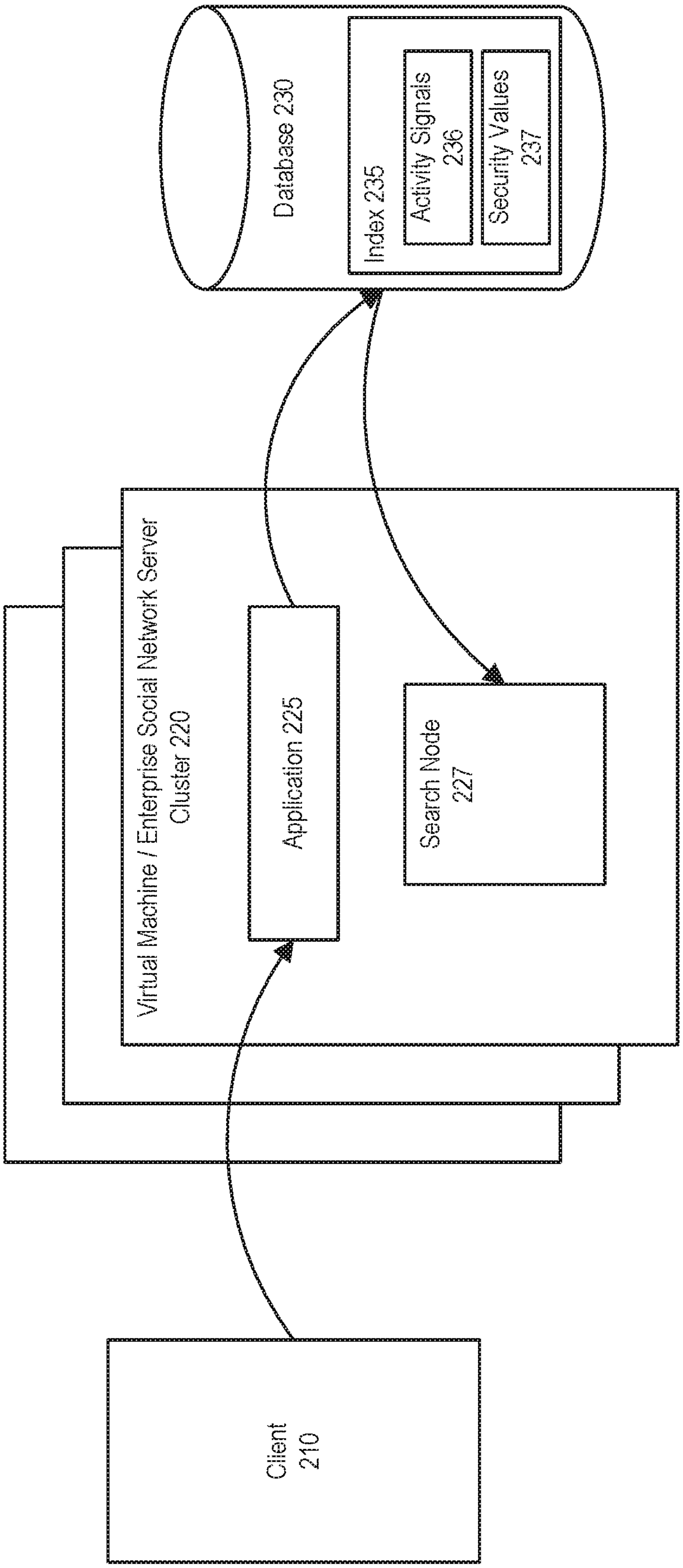
FIG. 2 illustrates support for identifying experts on arbitrary topics in an enterprise social network, in accordance with embodiment.

FIG. 2 illustrates support for identifying experts on arbitrary topics in an enterprise social network, in accordance with embodiment. More specifically, an indexing implementation for supporting identifying experts on arbitrary topics in an enterprise social network is shown in FIG. 2. As shown in FIG. 2, a user/client 210 can post a message or document to a conversation/thread within the enterprise social network cluster 220 via a communication path, such as at HTTP call to the enterprise social network server cluster. An application 225 within the enterprise social network server cluster can handle the request and write the message or document text to a database table.

In accordance with an embodiment, the application can, via a search node 227, index information currently residing on the database. Additionally, the application 225 can also poll a database 230 periodically. When the application detects new information residing on the database, it can add this information to the index 235 via the search node. The index can be stored on a database and can include activity signals 236 and security values 237 associated with the indexed information.

In accordance with an embodiment, the application 225 can be a node of an application cluster, and the search node can be a node of a search cluster, the search cluster having one node for every application node.

Figure 3:
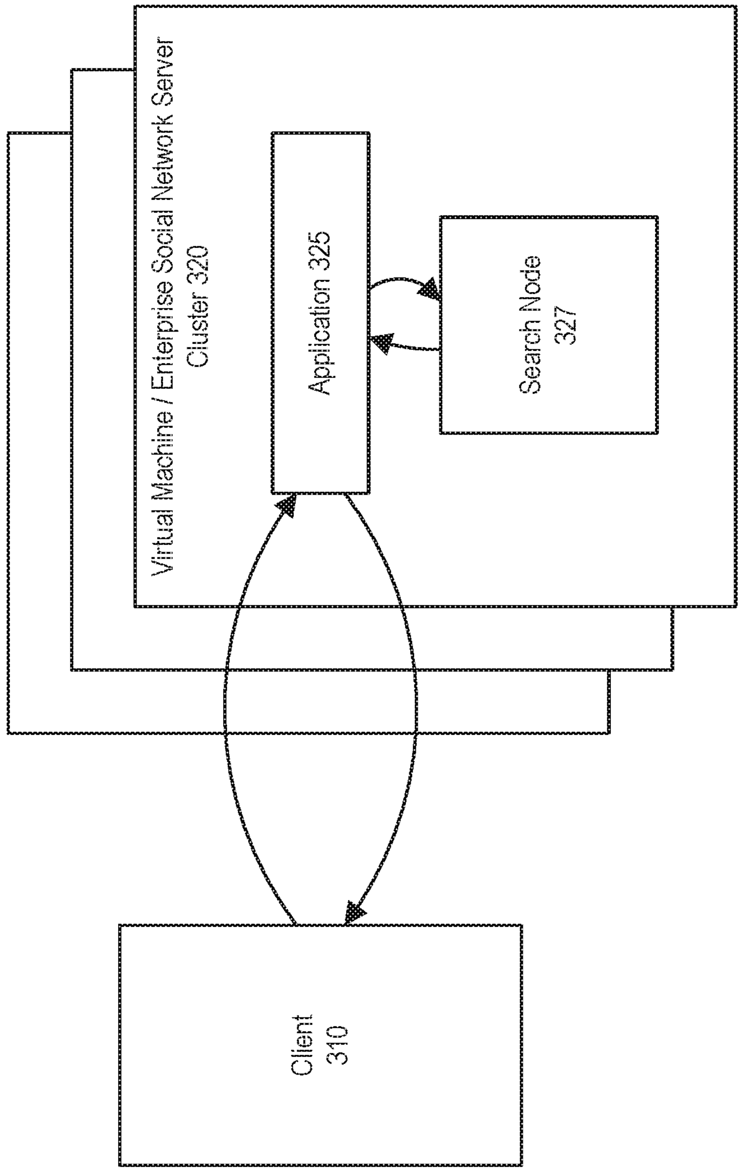
FIG. 3 illustrates support for identifying experts on arbitrary topics in an enterprise social network, in accordance with embodiment.

FIG. 3 illustrates support for identifying experts on arbitrary topics in an enterprise social network, in accordance with embodiment. More specifically, a searching implementation for supporting identifying experts on arbitrary topics in an enterprise social network is shown in FIG. 3. As shown in FIG. 3, a user/client 310 can execute a search. The search can be contained in, for example, an HTTP request to an application within an enterprise social network cluster. The application 325 within the enterprise social network server cluster 320 can handle the request and pass the search query to its local search node 327. The local search node can the query other nodes in the search cluster, which in turn query indexes, aggregate the results and pass the results back to the application 325. Then, the application can send the search results, such as the identification of experts on a searched topic, back to the client 310.

FIG. 4 illustrates an intermediate search result, in accordance with an embodiment. As shown in FIG. 4, a client/user can search for a term, such as "kitten", as described above. The system can locate text matches by searching the content 435 as well as the conversation 430 of various posts. The search can also assign relevance scores 410, which incorporate activity metrics. The activity metrics can include, but are not limited to, likes 420, downloads 425.

In accordance with an embodiment, instead of returning to a searcher the content and conversation in a ranked order, the search can instead return the various authors 415 identified in by the search, such as Author 1 and Author 2.

Figure 5:
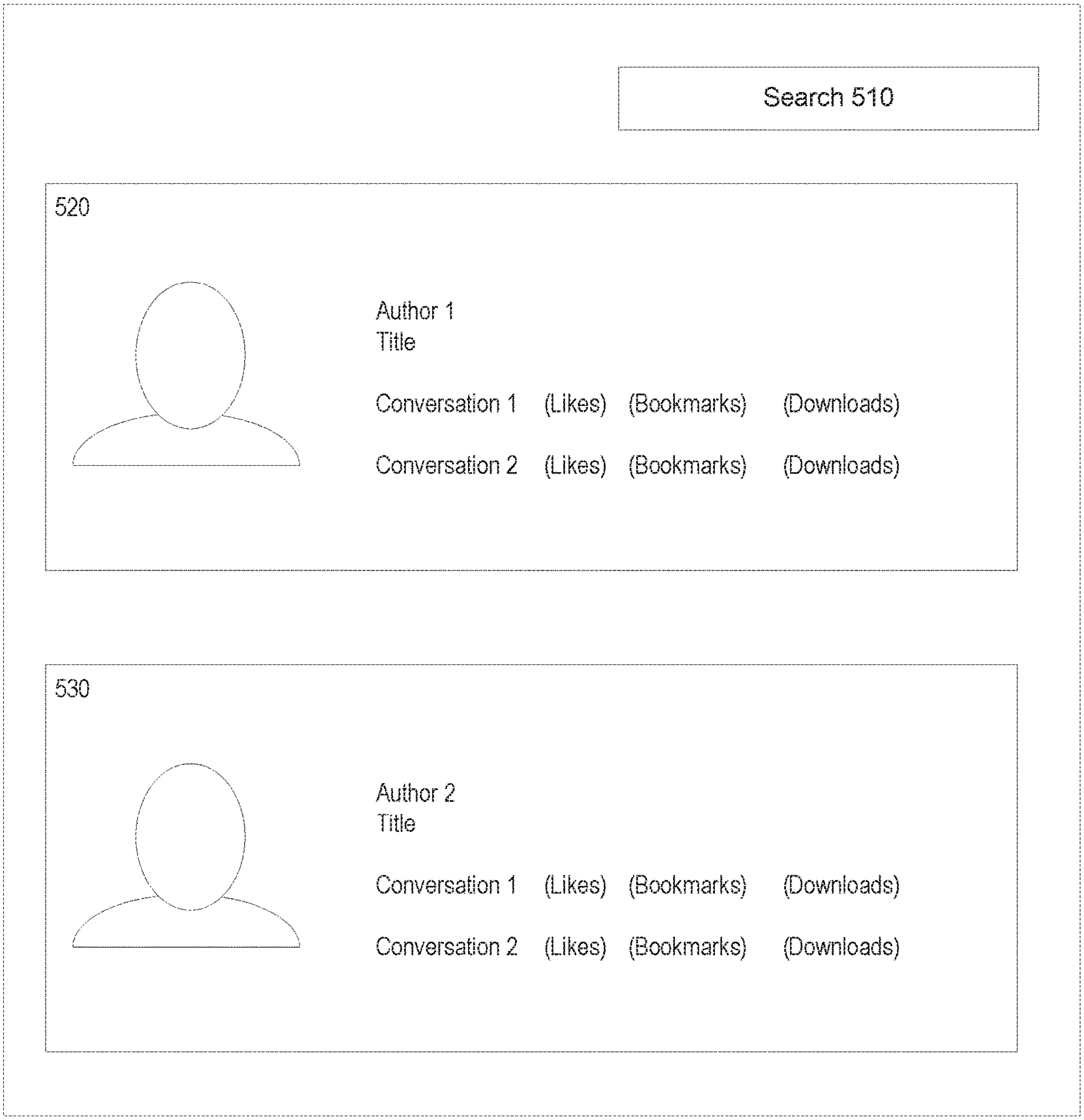
FIG. 5 illustrates a search result that identifiers experts in arbitrary topics within an enterprise social media network, in accordance with an embodiment.

FIG. 5 illustrates a search result that identifiers experts in arbitrary topics within an enterprise social media network, in accordance with an embodiment. FIG. 5 illustrates a search result page, which includes a search term bar 510, and a number of search results 520, 530, each search result indicating an identified expert.

In accordance with an embodiment, the disclosed methods and systems can assign a relevance score by summing up the relevance of each author's submitted/posted material within the enterprise social network. Authors can be presented as expert results to the searcher ordered by aggregate author relevance. Aggregate information about the underlying content results can also be presented in each expert result (e.g., conversation, likes, downloads, comments, bookmarks . . . etc.) As shown in the example of FIG. 5, Author 1, having a higher aggregate relevance score, is placed first in the search result window, while Author 2, having a lower aggregate relevance score, is places second.

Figure 6:
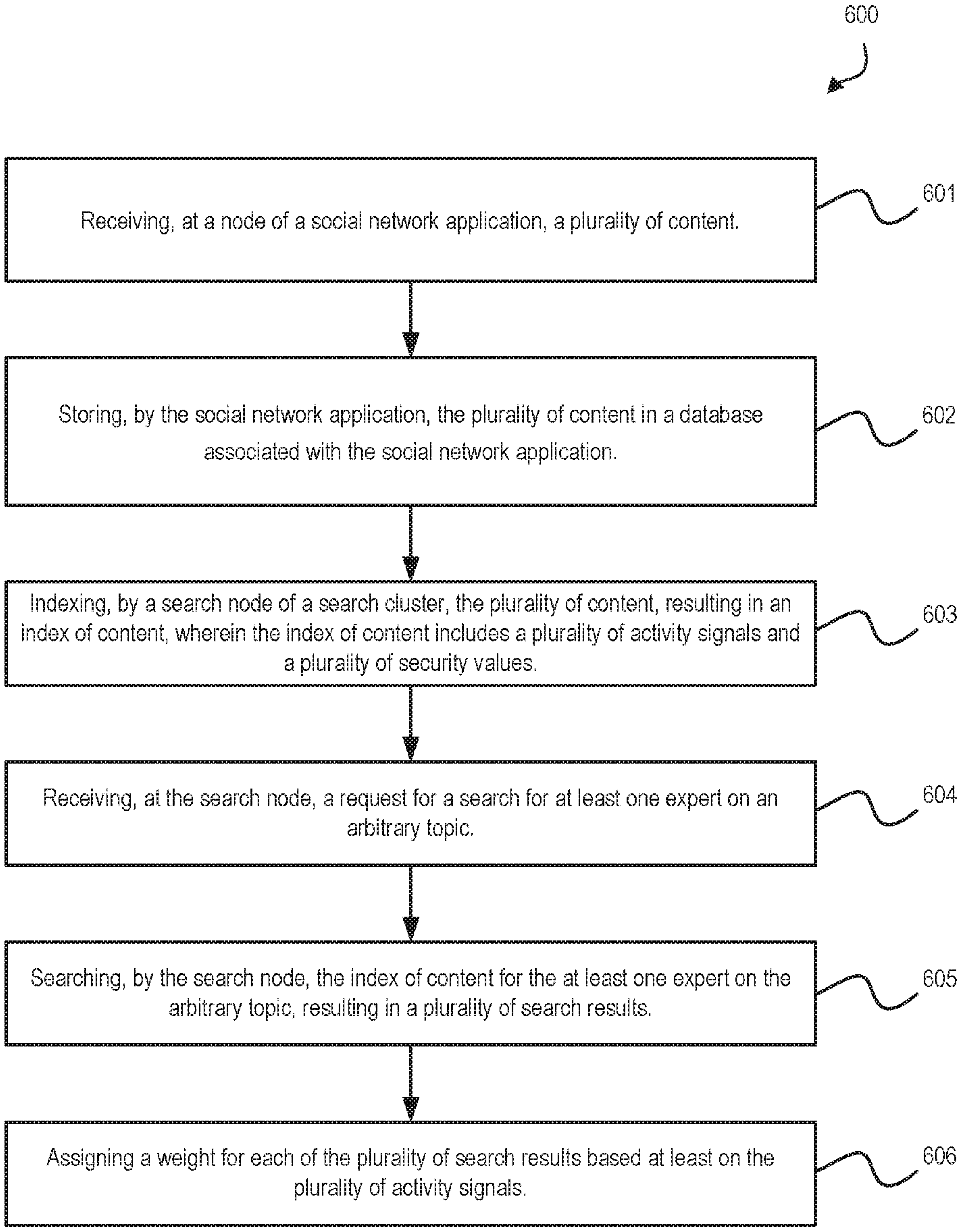
FIG. 6 illustrates, via a flow chart, a method for supporting identifying experts on arbitrary topics in an enterprise social network, in accordance with embodiment.

FIG. 6 illustrates, via a flow chart, a method 600 for supporting identifying experts on arbitrary topics in an enterprise social network, in accordance with embodiment.

At step 601, the method can receive, at a node of a social network application, a plurality of content.

At step 602, the method can store, by the social network application, the plurality of content in a database associated with the social network application.

At step 603, the method can index by a search node of a search cluster, the plurality of content, resulting in an index of content, wherein the index of content includes a plurality of activity signals and a plurality of security values.

At step 604, the method can receive, at the search node, a request for a search for at least one expert on an arbitrary topic.

At step 605, the method can search, by the search node, the index of content for the at least one expert on the arbitrary topic, resulting in a plurality of search results.

At step 606, the method can assign a weight for each of the plurality of search results based at least on the plurality of activity signals.

In accordance with an embodiment, the method can receiver, at a node of a social network application, a plurality of content, wherein the social network application causes the plurality of content to be stored in a database. The method can index, by a search node of a search cluster, the plurality of content, resulting in an index of content, wherein the index of content includes a plurality of activity signals and a plurality of security values. The method can search, by the search node, the index of content for an expert on a topic, resulting in a plurality of search results. The method can conclude with weighting each of the plurality of search results based at least on the plurality of activity signals.

Additional features of particular embodiments for supporting identifying experts on arbitrary topics in an enterprise social network are described in the attached Appendices.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for supporting identifying experts on arbitrary topics in an enterprise social network comprising:

receiving, at a node of a social network application, a plurality of content;

storing, by the social network application, the plurality of content in a database associated with the social network application;

indexing, by a search node of a search cluster, the plurality of content, resulting in an index of content, wherein the index of content includes a plurality of activity signals, wherein the plurality of activity signals comprises an indication of whether a content resolved an issue;

receiving, at the search node, a request for a search for at least one expert on an arbitrary topic defined by a search term;

searching, by the search node, the index of content for content matching the search term resulting in a plurality of search results; and determining a text matching score for each of said plurality of search results by comparing text of each said plurality of search results with the search term;

determining an activity score for each of said plurality of search results using the plurality of activity signals associated in the index with each of said plurality of search results;

calculating a relevance score for each of the plurality of search results using the activity score and the text matching score determined for said each of the plurality of search results;

identifying an author for each of the plurality of search results, resulting in a plurality of identified authors;

after identifying an author for each of the plurality of search results, calculating an author relevance score for each of the plurality of identified authors with respect to the arbitrary topic by, respectively, summing the relevance scores for each of the plurality of search results of which said each identified author is an author; and providing a response to the request for search for at least one expert on the arbitrary topic, wherein the response comprises a displayed ranked list of the plurality of identified authors together with a display of information underlying each author relevance score for each of the plurality of authors in the displayed ranked list, wherein the ranking of each of the plurality of identified authors is based upon the calculated author relevance score for each identified author of the plurality of identified authors with respect to the arbitrary topic, the ranked list displaying authors having a higher relevance score above authors having a lower relevance score.

2. The method of claim 1, wherein the response excludes the plurality of search results of content matching the search term.

3. The method of claim 1, wherein calculating the relevance score for each of the plurality of search results comprises:

summing the text matching score with the activity score.

4. The method of claim 1, wherein calculating the relevance score for each of the plurality of search results comprises:

applying an adjustable scaling factor to the activity score; and summing the text matching score with the activity score.

5. The method of claim 1, wherein the plurality of activity signals further comprise at least two of:

a number of likes, a number of downloads, a number of bookmarks, and an activity rank.

6. The method of claim 1, wherein the index of content further includes a plurality of security signals which comprise at least one of:

a private thread tag, a private group tag, a membership tag, and a subscription tag.

7. The method of claim 6, wherein the request for a search is associated with a searching entity, wherein the searching entity is associated with at least one security signal, the method further comprising:

filtering the plurality of search results based on a comparison of the at least one security signal signals associated with the searching entity and the plurality of security signals included in the index of content.

8. A system for supporting identifying experts on arbitrary topics in an enterprise social network, the system comprising:

one or more microprocessors; and a processor, running on the one or more microprocessors, wherein the processor operates to perform steps comprising:

receiving, at a node of a social network application, a plurality of content;

storing, by the social network application, the plurality of content in a database associated with the social network application;

indexing, by a search node of a search cluster, the plurality of content, resulting in an index of content, wherein the index of content includes a plurality of activity signals, wherein the plurality of activity signals comprises an indication of whether a content resolved an issue;

receiving, at the search node, a request for a search for at least one expert on an arbitrary topic defined by a search term;

searching, by the search node, the index of content for content matching the search term, resulting in a plurality of search results; and determining a text matching score for each of said plurality of search results by comparing text of each said plurality of search results with the search term;

determining an activity score for each of said plurality of search results using the plurality of activity signals associated in the index with each of said plurality of search results;

calculating a relevance score for each of the plurality of search results using the activity score and the text matching score determined for said each of the plurality of search results;

identifying an author for each of the plurality of search results, resulting in a plurality of identified authors;

after identifying an author for each of the plurality of search results, calculating an author relevance score for each of the plurality of identified authors with respect to the arbitrary topic by, respectively, summing the relevance scores for each of the plurality of search results of which said each identified author is an author; and providing a response to the request for search for at least one expert on the arbitrary topic, wherein the response comprises a displayed ranked list of the plurality of identified authors together with a display of information underlying each author relevance score for each of the plurality of authors in the displayed ranked list, wherein the ranking of each of the plurality of identified authors is based upon the calculated author relevance score for each identified author of the plurality of identified authors with respect to the arbitrary topic, the ranked list displaying authors having a higher relevance score above authors having a lower relevance score.

9. The system of claim 8, wherein the response excludes the plurality of search results of content matching the search term.

10. The system of claim 8, wherein the processor calculates the relevance score for each of the plurality of search results by:

summing the text matching score with the activity score.

11. The system of claim 8, wherein the processor calculates the relevance score for each of the plurality of search results by:

applying an adjustable scaling factor to the activity score; and summing the text matching score with the activity score.

12. The system of claim 8, wherein the plurality of activity signals further comprise at least two of:

a number of likes, a number of downloads, a number of bookmarks, and an activity rank.

13. The system of claim 8, wherein the index of content further includes a plurality of security signals comprising at least one of:

a private thread tag, a private group tag, a membership tag, and a subscription tag.

14. The system of claim 13, wherein the request for a search is associated with a searching entity, wherein the searching entity is associated with at least one security signal, the steps further comprising:

filtering the plurality of search results based on a comparison of the at least one security signal associated with the searching entity and the plurality of security signals included in the index.

15. A non-transitory machine readable storage medium having instructions stored thereon for supporting identifying experts on arbitrary topics in an enterprise social network, that when executed cause a system to perform the steps comprising:

receiving, at a node of a social network application, a plurality of content;

storing, by the social network application, the plurality of content in a database associated with the social network application;

indexing, by a search node of a search cluster, the plurality of content, resulting in an index of content, wherein the index of content includes a plurality of activity signals, wherein the plurality of activity signals comprises an indication of whether a content resolved an issue;

receiving, at the search node, a request for a search for at least one expert on an arbitrary topic defined by a search term;

searching, by the search node, the index of content for content matching the search term resulting in a plurality of search results; and determining a text matching score for each of said plurality of search results by comparing text of each said plurality of search results with the search term;

determining an activity score for each of said plurality of search results using the plurality of activity signals associated in the index with each of said plurality of search results calculating a relevance score for each of the plurality of search results using the activity score and the text matching score determined for said each of the plurality of search results;

identifying an author for each of the plurality of search results, resulting in a plurality of identified authors;

after identifying an author for each of the plurality of search results, calculating an author relevance score for each of the plurality of identified authors with respect to the arbitrary topic by, respectively, summing the relevance scores for each of the plurality of search results of which said each identified author is an author; and providing a response to the request for search for at least one expert on the arbitrary topic, wherein the response comprises a displayed ranked list of the plurality of identified authors together with a display of information underlying each author relevance score for each of the plurality of authors in the displayed ranked list, wherein the ranking of each of the plurality of identified authors is based upon the calculated author relevance score for each identified author of the plurality of identified authors with respect to the arbitrary topic, the ranked list displaying authors having a higher relevance score above authors having a lower relevance score.

16. The non-transitory machine readable storage medium of claim 15, wherein the response excludes the plurality of search results of content matching the search term.

17. The non-transitory machine readable storage medium of claim 15, wherein calculating the relevance score for each of the plurality of search results using the plurality of activity signals comprises, for each search result:

summing the text matching score with the activity score.

18. The non-transitory machine readable storage medium of claim 15, wherein calculating the relevance score for each of the plurality of search results using the plurality of activity signals comprises, for each search result:

applying an adjustable scaling factor to the activity score; and summing the text matching score with the activity score.

19. The non-transitory machine readable storage medium of claim 15, wherein the plurality of activity signals further comprise at least two of:

a number of likes, a number of downloads, a number of bookmarks, and an activity rank.

20. The non-transitory machine readable storage medium of claim 19, wherein the index of content further includes a plurality of security signals which comprise at least one of:

a private thread tag, a private group tag, a membership tag, and a subscription tag.

* * * * *